Figure 5:
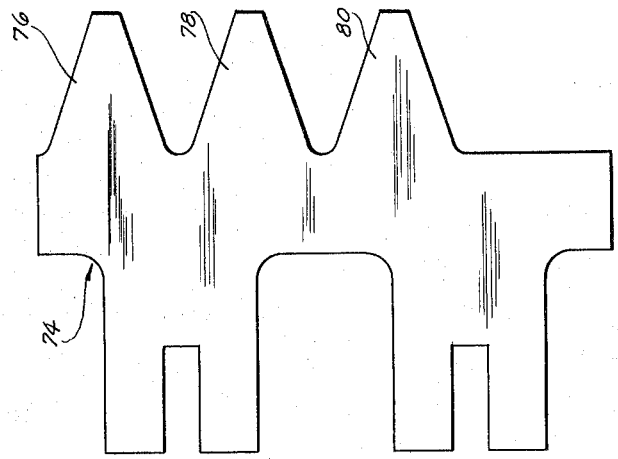

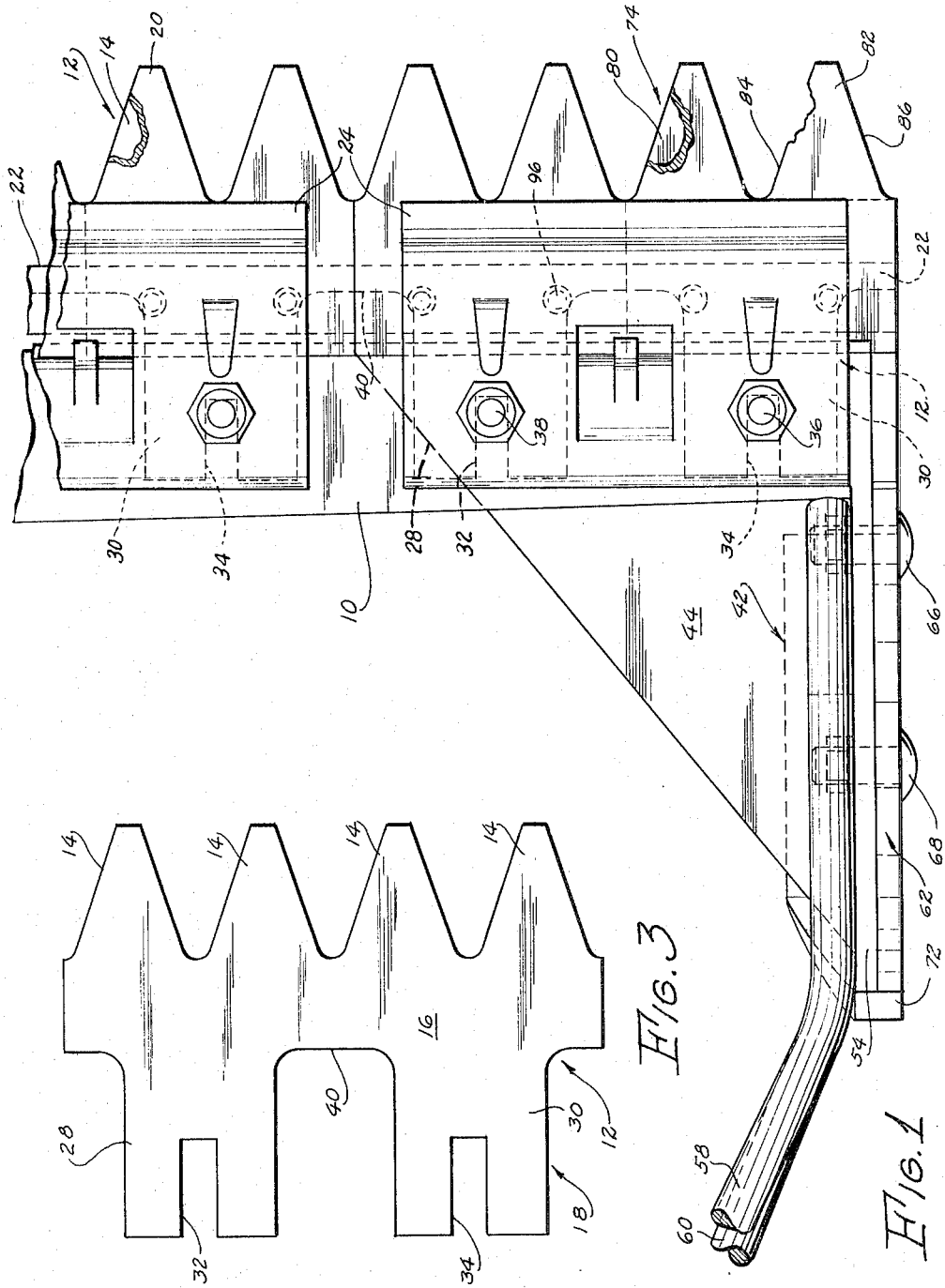

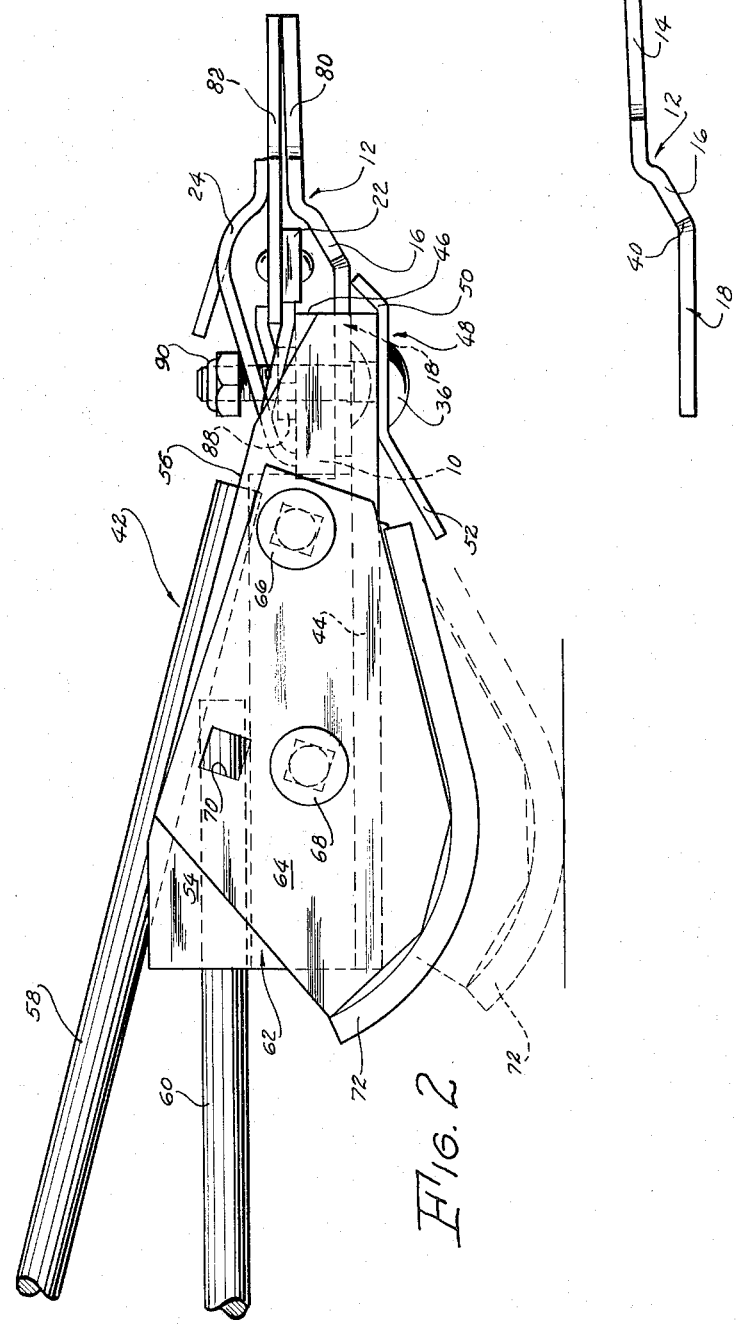

Jan. 3, 1967  L. R. YESKE  3,295,300
AGRICULTURAL IMPLEMENT
Filed March 31, 1964  3 Sheets-Sheet 3

INVENTOR.
LAUREL R. YESKE
BY
Emerson B Donnell ATTY.
Robert O. Goddard AGT.

United States Patent Office 3,295,300
Patented Jan. 3, 1967

3,295,300
AGRICULTURAL IMPLEMENT
Laurel R. Yeske, Rockford, Ill., assignor to J. I. Case Company, Racine, Wis., a corporation of Wisconsin
Filed Mar. 31, 1964, Ser. No. 356,216
6 Claims. (Cl. 56—296)

The present invention relates to agricultural implements and more particularly to cutter bars of the type usually used in mowers, grain harvesting equipment and the like; and an object of the invention is to generally improve the construction and operation of these devices. The invention relates especially to the stationary blades or guards which support the knife sections in proper shearing relation, and to a highly advantageous outer shoe construction.

A cutter bar of this nature, as is well known, consists of a long heavy rigid bar which is propelled through the crop to be harvested, in a position transverse or usually at right angles to the direction of movement. Along its leading edge, it has a plurality of forwardly directed cutting plates or guards, with which cooperate a series of cutting elements or sickle sections fixed to a reciprocating rod or shaft, so that the individual sections may each cooperate with one or more of the guards to form a series of shearing devices. In the past, the guards have been commonly formed of individual pieces which were rigid and of relatively complicated cross section, either malleable castings, steel forgings, or stampings. In order to maintain proper shearing relation, the guards had to be rather highly accurate in dimensions, and were therefore relatively costly. Furthermore, at the outer end of the cutter bar, there was difficulty in view of the fact that the bar was supported at this point by means of a sliding shoe or slipper which interfered with the fastening of the outermost guard, and therefore was commonly made to incorporate a guard or cutting blade of its own. This introduced still another problem in locating and properly fitting the latter blade to the reciprocating knife.

The invention comprehends the forming of the cutter units from flat spring steel, a material which lends itself well to forming a good cutting edge, and optionally to receiving a separate cutting blade or ledger plate. This device also provides unusually rapid and smooth cutting by spacing the blades and sickle sections closer than heretofore, while retaining the same knife stroke. The invention also contemplates a type of outer shoe which is fastened to the cutter bar by the same bolts which hold the cutting blades, the shoe being clear of the blades so that no precise fitting of the shoe is required.

The blade units are mounted on the bar by means of rearwardly extending spaced tongues which add to the resiliency of the mounting, and provide a space for the escape of dirt, which has been troublesome in prior constructions, and the tongues are slotted for engagement with their fastening means to provide for easy and quick assembly and disassembly.

In view of the above, the principal object of the invention is to provide a cutter bar construction having cutting blades which are easily fabricated; easily attached; flexible enough to adjust themselves to correct shearing relation to the reciprocating knife; which are extremely resistant to damage; and easily and cheaply replaced in case damage does occur.

A further object is to provide a cutter bar construction having a novel outer shoe which is independent of the cutting elements and serves only to support the outer end of the cutter bar, and to carry the swather.

Figures 6, 7:
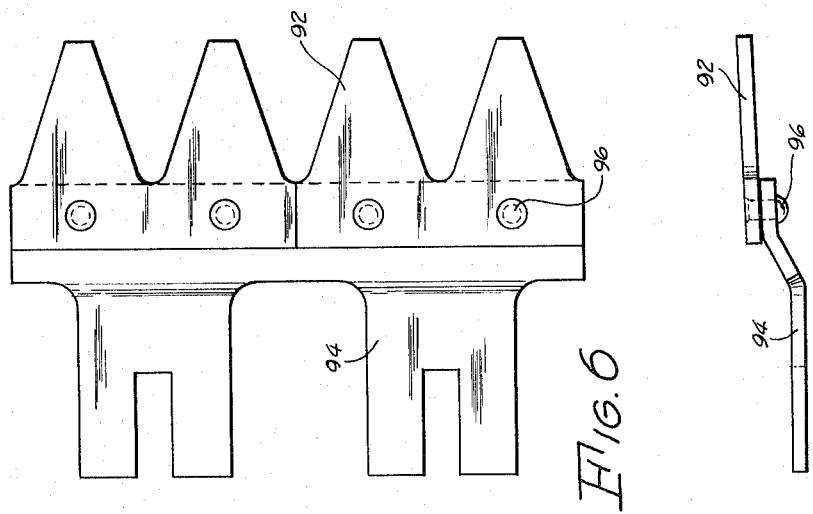
Figure 8:
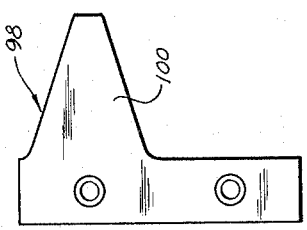

Further objects and advantages will become apparent from the following specification and the accompanying drawings, in which:

FIGURE 1 is a plan view of so much of a cutter bar as necessary to illustrate the invention, parts being broken away to reveal what lies beneath;
FIG. 2 is a right end elevation of the same with parts broken away;
FIG. 3 is a plan view of a blade section;
FIG. 4 is an end view of the same;
FIG. 5 is a plan view similar to FIG. 3, showing a special blade section;
FIG. 6 is a plan view of a modified type of blade section;
FIG. 7 is an end view of the modified blade section shown in FIG. 6; and
FIG. 8 is a plan view of a special knife section which is used at the end of the cutter bar when the blade section shown in FIG. 6 is used.

The cutter bar with which the new cutting element is associated comprises basically a heavy bar 10 supported in any well-known manner on a suitable propelling vehicle, not shown, projecting outwardly therefrom, and usually of decreasing width toward its outer end; although in the case of a combine or the like, the bar may take any convenient form, and is usually fastened along the length of the header structure in a manner well known and forming no part of the present invention. Bar 10 has attached thereto, a large number of cutting plates or guard units, one of which is generally designated as 12 in FIGS. 1, 3, and 4. Guard 12 has a plurality of blade portions 14, connected by a downwardly inclined portion 16 to a rearwardly directed portion 18 which is rigidly clamped to the underside of bar 10. Blade portions 14 have cooperating therewith, sickle sections 20, FIGS. 1 and 2, fixed to a reciprocating rod or shaft 22, preferably located slightly forwardly of bar 10, sections 20 being pressed downwardly into shearing contact with blades 14 by means of hold-down clips 24, it being understood that there will be a series of blades 14 and sickle sections 20 disposed along the length of bar 10 so that reciprocation of rod 22 will cause sickle sections 20 to move in shearing relation with blades 14 with the result that crop material which comes between the sickle sections and blades will be cut off to flow backwardly over the cutter bar. As will be understood, a plurality of hold-down clips 24 will be distributed along the length of bar 10 so that all of the sickle sections are pressed or guided into the proper relation to blades 14, and the fit or shearing relation between sickle sections 20 and blades 14 is greatly facilitated by the fact that blades 14, portions 16 and portion 18 thereof are somewhat flexible. The blade units, if there is any unevenness in their dimensions or positions, may yield slightly under the downward pressure of sickle sections 20 to find a true shearing contact with the latter.

Returning to a more detailed description of the structure, the guard or cutter plate units each comprise abovementioned portion 16, FIG. 3, to be disposed along the length of bar 10 and having a plurality, in this instance four, of hereinbefore mentioned blade sections 14 extending forwardly therefrom. Portion 16 also has a pair of spaced rearwardly extending tongues 28 and 30, which constitute above-mentioned portion 18, said tongues having slots 32 and 34 to receive bolts 36 and 38, FIGS. 1 and 2, it being possible to remove and replace any guard unit 12 by a simple fore-and-aft movement when bolts 36 and 38 are properly loosened.

It is to be noted that blade portions 14 and sickle sections 20 are smaller than usual, and in the present embodiment they are made so as to be spaced half as far from each other as in conventional practice, without, however, reducing the length of the sickle stroke. In this way, each sickle section is made to cut against two blades or ledger plates on each stroke, instead of against the usual one blade. The result of this action is smoother and more efficient cutting than is accomplished by the conventional arrangement.

The spacing of tongues 28 and 30 provides a notch 40 which extends forwardly into portion 16 a substantial distance forwardly of the front edge of bar 10 so that a fairly generous opening is provided between bar 10 and blade portions 14 and so that the amount of material between the clamping portions of tongues 28 and 30 and portion 16 is largely reduced, which fact will increase the flexibility of the blade unit as a whole, over what it would be if notch 40 were not present.

Guard unit 12 is readily stamped from sheet metal before hardening and tempering and, in the forming process, is bent to form the hereinbefore mentioned incline portion 16, more particularly shown in FIG. 4, and, as will be appreciated, such a unit may be made of very high quality at little cost or expense.

While portions 18 and blades 14 are disposed in a generally horizontal position, it will be noted that when portion 18 is truly horizontal, blades 14 are forwardly and upwardly inclined a slight amount so that under the downward pressure of sickle sections 20, they may yield slightly to form a well-nigh perfect seating of sickle sections 20 on blade portions 14. It will be apparent that because of this quality, if there is a slight unevenness in the disposition of blades 14, or sickle sections 20, one blade 14 may yield more than another so that adjacent sickle sections may fit properly on their respective cutting blades, and not be lifted clear by engagement of the parts that are less than perfectly aligned. In this way, proper shearing contact is readily achieved between the blades and sickle sections throughout the entire length of the cutter bar.

At the end of bar 10, an outer shoe generally designated as 42 is attached and comprises a generally triangular plate 44 which is clamped beneath bar 10 and against portions 18. Plate 44 extends beneath bar 10 to a point subsantially flush with the forward edge 46 thereof, and along the length of bar 10, a sufficient distance to receive above-mentioned bolts 36 and 38. Interposed between bolts 36 and 38 and plate 44 is a shielding plate 48 having an upwardly turned front edge 50, and downwardly turned rear edge 52. Plate 48 serves to present a relatively smooth under-surface to the crop in the region of plate 44 to facilitate the passage of the cutter bar. Plate 44 also has an upwardly directed plate 54 welded or otherwise permanently united therewith beyond the end of bar 10 so as to enclose the latter, plate 54 having a forwardly and downwardly inclined upper edge 56 which terminates at a point lower than rod 22 and the last sickle section 20 so that the knife structure may pass through, beyond plate 54 during its reciprocating movement. Plate 54 has a pair of rods 58 and 60 permanently united therewith, rod 58 extending upwardly, rearwardly and inwardly, and rod 60 extending rearwardly and inwardly, to guide crop material harvested by the cutter bar away from the standing crop and into the swath left by the cutter bar.

Plate 54 has a slipper generally designated as 62 comprising a plate 64 secured to plate 54 outwardly thereof by a bolt 66. Bolt 66 may serve as a pivot for plate 64, the plate however being secured against pivoting about bolt 66 by a bolt 68. Plate 64 has an extra hole 70 so that plate 64 may be anchored in a different position by removing bolt 68, swinging plate 64 downwardly and reinstalling bolt 68 in hole 70. This will give a different height of operation for the cutter bar at the outer end thereof. Plate 64 has a relatively wide curved shoe 72 fixed to the lower edge thereof to slide along the ground, and thereby guide and support the outer end of bar 10.

While the majority of guard units 12 are identical, a special guard unit 74 (FIG. 5) is placed at the outer end of bar 10, engaged with bolts 36 and 38, and which is substantially identical with guard unit 12, except that it has only three blade units, 76, 78, and 80. The fourth blade corresponding to blade 14, the lowermost in FIG. 3, is removed. In the normal operation of the device, the outer sickle section 82 moves entirely beyond blade 80 and returns in its reciprocating movement so as to cut with its edges 84 and 86 on both sides of blade element 80.

It will now be apparent that outer shoe 42 does not interfere in any way with the operation of sickle bar 22 or sickle sections 20; that blade element 80 is independent of shoe 42, and that shoe 42 does not need to have a blade element or ledger plate of any kind, and therefore involves no problem of precise fitting on bar 10.

Bolt 36 extends upwardly through plate 48, plate 44, portion 18 and bar 10, as best seen in FIG. 2, and has a nut 88 engaged with the upper surface of bar 10, and which may be tightened to clamp the several pieces together. Bolt 36 continues upwardly through spring clip 24 and has another nut 90 engaged with a portion of clip 24 and which may be threaded up and down on bolt 36 to adjust the downward pressure of clip 24.

Modifications of the disclosed construction are contemplated; as for example, separate ledger plates or blade units 92, FIG. 7. These may be independent or formed in pairs and fastened to a base unit 94 by means of rivets or other suitable fastening means 96. The resulting structure will have the advantages described for guard unit 12, but additionally, the actual blades or ledger plates 92 may be removed and replaced when dulled or damaged, to restore the efficiency of the cutter bar. Furthermore, such a construction would permit the shearing edges to be made of hardened or otherwise still more desirable material than the spring steel forming the base unit 94.

The end unit of this embodiment would start with one blade section 98, FIG. 8, having a single ledger plate 100, so that the completed unit would have only three blade portions, as in the case of the FIG. 5 embodiment.

As will be apparent, the advantage of flexibility or springiness would be present to a large degree in this modification. Also, the faculty of disposing of dirt would be the same as in the case of the embodiment shown in FIGS. 1, 2, and 3.

The operation of the device is thought to be clear from the foregoing, it being apparent that the knife section including the sickle sections 20 will reciprocate, sliding on and being supported by the cutter blades or ledger plates 14, the latter being flexible enough to be pressed down slightly by the pressure of the sickle sections. This will insure proper seating of the sickle sections on the ledger plates. Furthermore, dirt or other debris which might otherwise tend to accumulate rearwardly of sickle sections 20 will find its way around rod 22 and escape through slots 40 forwardly of bar 10.

By reason of the closely spaced blade units and sickle sections together with the long stroke, the cutting mechanism makes two cuts for each stroke of the sickle so that the cutting action is extremely smooth and fast.

The outer shoe is so designed as to be fastened to bar 10 by the same bolts which hold the outer blade units in place, and is so shaped that the latter are supported in their usual places and for their usual purposes, it not being necessary to provide any ledger plate or the equivalent on the outer shoe.

If desired, the advantages of the construction may be realized with ledger plates which are replaceable, and which may be made of even better material than the spring steel used in the preferred embodiment.

Variations of the structure may well occur to those skilled in the art, and it is to be understood that the invention is not to be considered as limited by the embodiments disclosed, or in fact in any manner except as defined in the following claims.

What is claimed as new and desired to be secured by Letters Patent of the United States is:

1. A cutting mechanism of the type to be carried by a mobile support for harvesting crop material in a path parallel to the path of movement of said support, said mechanism comprising a bar carried on said support in a position generally parallel to the ground and transverse to the path of movement of said support, a knife including a plurality of sickle sections reciprocable along the bar, a cutting plate fixed along the length of said bar in a position cooperating with said sickle sections to cut crop material presented to said cutting mechanism by movement of said bar with said mobile support, said cutting plate being sufficiently thin to be resiliently flexible and made of spring material and providing a plurality of ledger portions projecting forwardly from said bar and shaped to be substantially congruent with said sickle sections in one position of said knife, said cutting plate having a portion fastened beneath said bar, projecting forwardly and bending upwardly and again forwardly at a point spaced forwardly of said bar to provide a channel forwardly of said bar for reciprocation of a portion of said knife in said channel, said ledger portions being located in supporting relation to said sickle sections and slightly upwardly inclined toward said sickle sections to be depressed by said sickle sections into correct face to face seating relation with said sickle sections, and into correct shearing contact between said sickle sections and said ledger portions.

2. A cutting mechanism of the type to be carried by a mobile support for harvesting crop material in a path parallel to the path of movement of said support, said mechanism comprising a bar carried on said support in a position generally parallel to the ground and transverse to the path of movement of said support, a knife including a plurality of sickle sections reciprocable along the bar, a cutting plate fixed along the length of said bar having a portion spaced forwardly thereof in a position cooperating with said sickle sections to cut material presented to said cutting mechanism by movement of said bar with said mobile support, said cutting plate being sufficiently thin to be resiliently flexible and made of spring material and providing a plurality of ledger portions projecting forwardly from said forwardly spaced portion and shaped to be substantially congruent with said sickle sections in one position of said knife, said cutting plate having a portion fastened beneath said bar, projecting forwardly and bending upwardly and again forwardly at a point spaced forwardly of said bar to provide a channel forwardly of said bar for reciprocation of a portion of said knife in said channel, said ledger portions being located in supporting relation to said sickle sections and slightly upwardly inclined toward said sickle sections to be depressed by said sickle sections into correct face to face seating relation with said sickle sections and into correct shearing contact between said sickle sections and said ledger portions, said cutting plate portion fastened beneath said bar comprising a plurality of rearwardly extending spaced tongues, sufficiently thin to be resiliently flexible, and clamped in supported relation with said bar, and extending across the space between said bar and said forwardly spaced portion.

3. A cutting mechanism of the type to be carried by a mobile support for harvesting crop material in a path parallel to the path of movement of said support, said mechanism comprising a bar carried on said support in a position generally parallel to the ground and transverse to the path of movement of said support, a knife including a plurality of sickle sections reciprocable along the bar, a cutting plate fixed along the length of said bar having a portion spaced forwardly thereof in a position cooperating with said sickle sections to cut crop material presented to said cutting mechanism by movement of said bar with said mobile support, said cutting plate being sufficiently thin to be resiliently flexible and made of spring material and providing a plurality of ledger portions projecting forwardly from said forwardly spaced portion and shaped to be substantially congruent with said sickle sections in one position of said knife, said cutting plate having a portion fastened beneath said bar, projecting forwardly and bending upwardly and again forwardly at a point spaced forwardly of said bar to provide a channel forwardly of said bar for reciprocation of a portion of said knife in said channel, said ledger portions being located in supporting relation to said sickle sections and slightly upwardly inclined toward said sickle sections to be depressed by said sickle sections into correct face to face seating relation with said sickle sections and into correct shearing contact between said sickle sections and said ledger portions, said cutting plate portion fastened beneath said bar comprising a plurality of rearwardly extending spaced tongues sufficiently thin to be resiliently flexible, and clamped in supported relation with said bar and extending across the space between said bar and said forwardly spaced portion, each of said tongues providing a rearwardly directed slot, and means engaged in said slots and operative to clamp said tongues in supported relation to said bar.

4. A cutting mechanism of the type to be carried by a mobile support for harvesting crop material in a path parallel to the path of movement of said support, said mechanism comprising a bar carried on said support in a position generally parallel to the ground and transverse to the path of movement of said support, a knife including a plurality of sickle sections reciprocable along the bar, an upwardly inclined cutting plate fixed along the length and having a portion spaced forwardly of said bar in a position cooperating with said sickle sections to cut crop material presented to said cutting mechanism by movement of said bar with said mobile support, said cutting plate being resiliently flexible and made of spring material and providing a plurality of rearwardly extending spaced flexible tongues extending across the space between the forwardly spaced cutting plate portion and said bar said tongues being sufficiently thin to be depressed by said sickle sections so that said cutting plate may yield for correct seating of said sickle sections on said cutting plate, said tongues being clamped in supported relation to said bar, and means engaged with said tongues and operative to clamp said tongues in supported relation to said bar.

5. A cutting mechanism of the type to be carried by a mobile support for harvesting crop material in a path parallel to the path of movement of said support, said mechanism comprising a bar carried on said support in a position generally parallel to the ground and transverse to the path of movement of said support, a knife including a plurality of sickle sections reciprocable along the bar, a cutting plate fixed along the length of said bar in a position cooperating with said sickle sections to cut crop material presented to said cutting mechanism by movement of said bar with said mobile support, said cutting plate being sufficiently thin to be resiliently flexible and made of spring material and providing a plurality of ledger portions projecting forwardly from said bar and slightly upwardly inclined toward said sickle sections, said cutting plate being sufficiently flexible to be depressed by said sickle sections to insure correct face to face seating of said sickle sections on said ledger portions and correct shearing contact between said sickle sections and said ledger portions by reason of depression of said cutting plate.

6. A cutting mechanism of the type to be carried by a mobile support for harvesting crop material in a path parallel to the path of movement of said support, said mechanism comprising a bar carried on said support in a position generally parallel to the ground and transverse to the path of movement of said support, a knife including a plurality of sickle sections reciprocable along the bar, a
  cutting plate fixed along the length and having a portion spaced forwardly of said bar in a position cooperating with said sickle sections to cut crop material presented to said cutting mechanism by movement of said bar with said mobile support, said cutting plate being sufficiently thin to be resiliently flexible and made of
  spring material and providing a plurality of
  ledger portions projecting forwardly from said forwardly spaced portion of said bar and slightly upwardly inclined toward said sickle sections to be depressed by said sickle sections to insure correct seating of said sickle sections on said ledger portions and correct shearing contact between said sickle sections and said ledger portions, said resiliently flexible cutting plate having a plurality of rearwardly extending spaced flexible
  tongues extending across the space between said cutting plate portion and said bar whereby said cutting plate may yield downwardly for correct seating of said sickle sections with said ledger portions, said tongues being sufficiently thin to be flexed by the pressure of said sickle sections, and
  means engaged with said tongues and operative to clamp said tongues in supported relation to said bar.

References Cited by the Examiner
UNITED STATES PATENTS

| | | | |
|---|---|---|---|
| 1,046,530 | 12/1912 | Woffrom. | |
| 2,528,659 | 11/1950 | Krause | 56—298 |
| 3,098,338 | 7/1963 | Myers | 56—307 X |
| 3,114,230 | 12/1963 | Blaauw | 56—297 |

FOREIGN PATENTS 381,283    3/1907    France.

ABRAHAM G. STONE, *Primary Examiner.*

RUSSELL R. KINSEY, T. GRAHAM CRAVER,
*Examiners.*

M. C. PAYDEN, *Assistant Examiner.*